United States Patent
Park et al.

(10) Patent No.: US 7,295,470 B2
(45) Date of Patent: Nov. 13, 2007

(54) NON-VOLATILE MEMORY DEVICE INCLUDING MULTI-PAGE COPYBACK SYSTEM AND METHOD

(75) Inventors: Min-Gun Park, Gyeonggi-do (KR); Seong-Kue Jo, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 11/298,186

(22) Filed: Dec. 8, 2005

(65) Prior Publication Data

US 2006/0227607 A1    Oct. 12, 2006

(30) Foreign Application Priority Data

Apr. 7, 2005    (KR) .................... 10-2005-0029067

(51) Int. Cl.
*G11C 11/34*    (2006.01)
(52) U.S. Cl. ............................ 365/185.12; 365/185.17
(58) Field of Classification Search ............ 365/185.12
See application file for complete search history.

(56) References Cited

U.S. PATENT DOCUMENTS

| | | | |
|---|---|---|---|
| 5,473,563 A | 12/1995 | Suh et al. | |
| 5,696,717 A | 12/1997 | Koh | |
| 6,414,880 B1* | 7/2002 | Yabe et al. | 365/189.05 |
| 6,496,415 B2* | 12/2002 | Tsao | 365/185.12 |
| 6,614,715 B2* | 9/2003 | Tsao et al. | 365/238.5 |
| 6,671,204 B2 | 12/2003 | Im | |
| 6,738,288 B2 | 5/2004 | Kawamura et al. | |
| 6,842,377 B2* | 1/2005 | Takano et al. | 365/185.21 |
| 2004/0202034 A1 | 10/2004 | Lee | |
| 2005/0185501 A1* | 8/2005 | Lee et al. | 365/238.5 |

FOREIGN PATENT DOCUMENTS

| | | |
|---|---|---|
| JP | 2004-030784 | 1/2004 |
| JP | 2004-178620 | 6/2004 |
| JP | 2004-311010 | 11/2004 |
| KR | 2004-0086923 | 10/2004 |

OTHER PUBLICATIONS

English language abstract of Korean Publication No. 2004-0086923.
English language abstract of Japanese Publication No. 2004-178620.
English language abstract of Japanese Publication No. 2004-030784.
English language abstract of Japanese Publication No. 2004-311010.

* cited by examiner

*Primary Examiner*—Amir Zarabian
*Assistant Examiner*—Anthan T Tran
(74) *Attorney, Agent, or Firm*—Marger Johnson & McCollom, P.C.

(57) ABSTRACT

A non-volatile memory device performs a multi-page copyback operation where after a plurality of copyback data read out from one or more mats are sequentially stored in a plurality of buffers, the stored data are simultaneously programmed to different mats. The copyback data may be read out without limitation to the location of mats and the number of copyback data to be read out from the respective mats. The read-out copyback data are simultaneously programmed to a plurality of mats.

14 Claims, 5 Drawing Sheets

United States Patent US 7,295,470 B2

NON-VOLATILE MEMORY DEVICE INCLUDING MULTI-PAGE COPYBACK SYSTEM AND METHOD

PRIORITY STATEMENT

This application claims priority from Korean Patent Application No. 2005-29067, filed on Apr. 7, 2005, the disclosure of which we incorporate by reference.

BACKGROUND

1. Field

The present invention relates to a non-volatile memory device and, more particularly, to a semiconductor memory device including a multi-page copyback system and method.

2. Related Art

Semiconductor memory devices are generally classified into random access memories (RAMs) and read-only memories (ROMs). RAMs are volatile memories that lose stored data when their power supplies are interrupted. RAMs include dynamic RAMs (DRAMs) and static RAMs (SRAMs). ROMs, on the other hand, are non-volatile memories that maintain stored data even when their power supplies are interrupted. ROMs include programmable ROMs (PROMs), erasable PROMs (EPROMs), electrically EPROMs (EEPROMs), and flash memories. Flash memories are widely used in computers, memory cards, and the like due in part to the capability of erasing data in block form.

Flash memory devices are typically categorized as NOR-type and NAND-type based on the way that memory cells are connected. A NOR-type flash memory device includes at least two cell transistors connected in parallel to a bitline. The NOR-type flash memory device stores data using channel hot electron injection and erases data using the Fowler-Nordheim (F-N) tunneling effect. A NAND-type flash memory device, on the other hand, includes at least two cell transistors connected in cascade to a bitline. The NAND-type flash memory device stores and erases data using the F-N tunneling effect. NOR-type flash memories operate at high speed but are not typically implemented in high integration designs due to high power consumption. NAND-type flash memories, on the other hand, are advantageous in high integration designs due to lower cell current consumption than NOR-type flash memories. Methods of programming and erasing NAND-flash memories are disclosed, e.g., in U.S. Pat. No. 5,473,563 entitled NONVOLATILE SEMI-CONDUCTOR MEMORY and U.S. Pat. No. 5,696,717 entitled NONVOLATILE INTEGRATED CIRCUIT MEMORY DEVICES HAVING ADJUSTABLE ERASE/ PROGRAM THRESHOLD VOLTAGE VERIFICATION CAPABILITY, respectively. We incorporate the '563 and '717 patents by reference.

NAND-flash memory devices support a page copyback operation. The page copyback operation involves copying a source page of data to a target page. For example, if a bad block is generated while data is written into a flash memory device, the bad block is marked as unusable. Previously successfully stored data are read out of the bad block and stored in another block. To do so, a page copyback operation is often used because it reduces the data transfer time significantly.

An exemplary NAND-type flash memory device performing a page copyback operation is disclosed in, e.g., U.S. Pat. No. 6,671,204 entitled NONVOLATILE MEMORY DEVICES WITH PAGE BUFFER HAVING DUAL REGISTERS AND METHOD OF USING THE SAME, which we incorporate by reference. According to the '204 patent, a NAND-type flash memory device needs a complex page buffer having a dual register structure to perform a page copyback operation. Control and configuration of such a dual register structure, however, becomes unwieldy when a plurality of page data must be copied.

Accordingly, a need remains for an improved semiconductor memory device and an associated multi-page copyback method.

SUMMARY OF THE INVENTION

We describe a semiconductor memory device having an improved structure to support a copyback operation. And we describe an improved copyback method capable of being implemented in a semiconductor memory device.

An embodiment of a non-volatile memory device includes a plurality of mats to store data, a plurality of page buffers to read and write data from the corresponding plurality of mats, a plurality of buffers to store copyback data read out from at least one mat, and a control unit to control the plurality of page buffers to substantially simultaneously program the copyback data from the plurality of buffers to the corresponding plurality of mats.

An embodiment of a method for multi-page copyback includes reading copyback data from at least one mat, storing the read copyback data into a plurality of buffers, sequentially transferring the stored copyback data from the plurality of buffers to a plurality of page buffers, and simultaneously programming the transferred copyback data from the plurality of page buffers to a corresponding plurality of mats.

An embodiment of a memory device includes a plurality of page buffers and a plurality of buffers. The plurality of page buffers is adapted to store copyback data read out from a corresponding plurality of mats. The plurality of buffers is adapted to buffer the copyback data transferred from the plurality of page buffers. The plurality of buffers sequentially transfers the copyback data back to the plurality of page buffers. And the plurality of page buffers is adapted to substantially simultaneously program the copyback data from the plurality of page buffers to the plurality of mats.

DETAILED DESCRIPTION OF THE INVENTION

We describe embodiments more fully with reference to the accompanying drawings.

Figure 1:
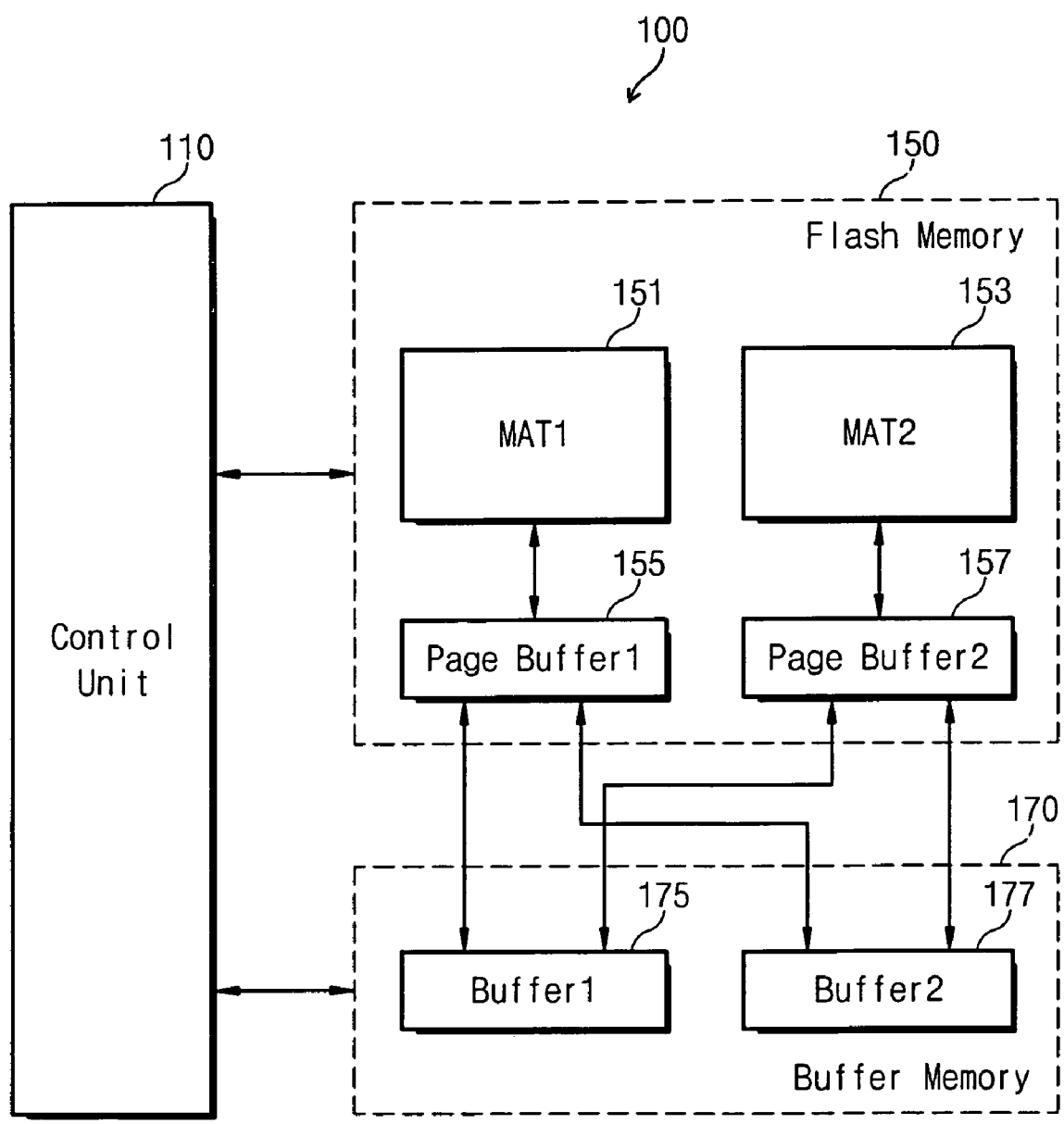
FIG. 1 is a block diagram of a non-volatile memory device embodiment.

As illustrated in FIG. 1, a flash memory device 100 includes a flash memory 150, a buffer memory 170, and a control unit 110 for controlling data input/output to/from the memories 150 and 170. The control unit 110 controls the input data to the flash memory 150 or the output of data stored in the flash memory 150.

The flash memory 150 is a NAND-type flash memory supporting a copyback operation. The flash memory 150 includes a plurality of mats 151 and 153 each having the same memory cell array structure. A plurality of page buffers 155 and 157 performs data input/output for the respective mats 151 and 153. The number of the page buffers 155 and 157 is equal to that of the mats 151 and 153 in the flash memory 150. As is well known to those skilled in the art, a latch circuit is constructed in the respective page buffers 155 and 157 to latch data to be written into and out of the respective mats 151 and 153. In an embodiment, the page buffers 155 and 157 have simple structures enough to perform basic data sensing and reading operations. Although described in detail below, a copyback operation may be performed for a plurality of pages using a buffer memory 170 constructed in the flash memory device 100 without use of page buffers 155 and 157 having any specific structures. Thus, the page buffers 155 and 157 may support a multi-page copyback operation even with a simple structure, e.g., single latch. The result is a simplified circuit configuration that reduces fabrication costs. Each of the page buffers 155 and 157 provides a multi-page program function to simultaneously program data to the corresponding mats 151 and 153 responsive to control of the control unit 110. To achieve this, the mats 151 and 153 may have independent X-decoders or a plurality of mats may share one X-decoder.

The flash memory 150 generally takes longer to read and write data relative to random access memories (RAMs) and cannot randomly access data like RAMs. To overcome these disadvantages, the flash memory device 100 uses a buffer memory 170. With the use of the buffer memory 170, the data input/output speed improves. The buffer memory 170 may be a random access memory, e.g., DRAM or SRAM. The buffer memory 170 includes buffers 175 and 177 each having a memory capacity of at least one page. The number of the buffers 175 and 177 is equal to that of the mats 151 and 153. If N mats are included in the flash memory 150, N buffer memories are included in the buffer memory 170 of an embodiment. In this case, program operations for N pages may be performed substantially simultaneously or coincidentally as well as copyback operations for the N pages.

The flash memory device 100 including the randomly accessible buffer memory 170 stores data transferred from a host in the buffer memory 170 and re-stores the stored data in the flash memory 150. Where data stored in the flash memory 150 is read out, the flash memory device 100 stores the read-out data in the buffer memory 170 and transfers the stored data to the host. The data input/output exchange between the flash memory 150 and the buffer memory 170 may apply to normal data exchanges as well as copyback data exchanges.

In a copyback operation, data read out from a first mat 151 is not always stored in the first buffer 175 and may be stored in either one of the first and second buffers 175 and 177. Similarly, data read out from a second mat 153 is not always stored in the second buffer and may be stored in either one of the first and second buffers 175 and 177. In a multi-page copyback operation, the flash memory device 100 sequentially stores copyback data read out from one or more mats 151 and 153 in a plurality of buffers 175 and 177 and simultaneously programs the stored data to different mats 151 and 153. These copyback data may be read out without location limitations of the mats 151 and 153 and the number of copyback data to be read out. The read-out data are substantially simultaneously or coincidentally written into a plurality of mats 151 and 153 through a plurality of page buffers 155 and 157. The copyback data stored in a first buffer 175 is written into a first mat 151, and the copyback data stored in a second buffer 177 is written into a second mat 153. If the copyback data stored in the first and second buffers 175 and 177 are all copyback data read out from the first mat 151, these copyback data are substantially simultaneously or coincidentally written into a plurality of mats 151 and 153 that do not duplicate. If the copyback data stored in the first and second buffers 175 and 177 are copyback data read out from the first and second mats 151 and 153 respectively, these copyback data are also written into a plurality of mats 151 and 153 that do not duplicate. The applicants have chosen to use the term substantially simultaneously or coincidentally to refer to events happening at about the same time but not necessarily at exactly the same time.

For the convenience of description of the invention, a multi-page copyback method has been described in a case where a flash memory device 100 includes two mats 151 and 153 and two buffers 175 and 177. Nevertheless, the multi-page copyback method according to the invention may be applied to a non-volatile memory device including N mats and N buffers. Further, data read and re-write operations for a plurality of pages may be applied to not only a copyback operation but also to read-out data that is partially corrected to be re-written. The multi-page copyback method of the flash memory device 100 according to the invention will now be described more fully below.

Figure 2:
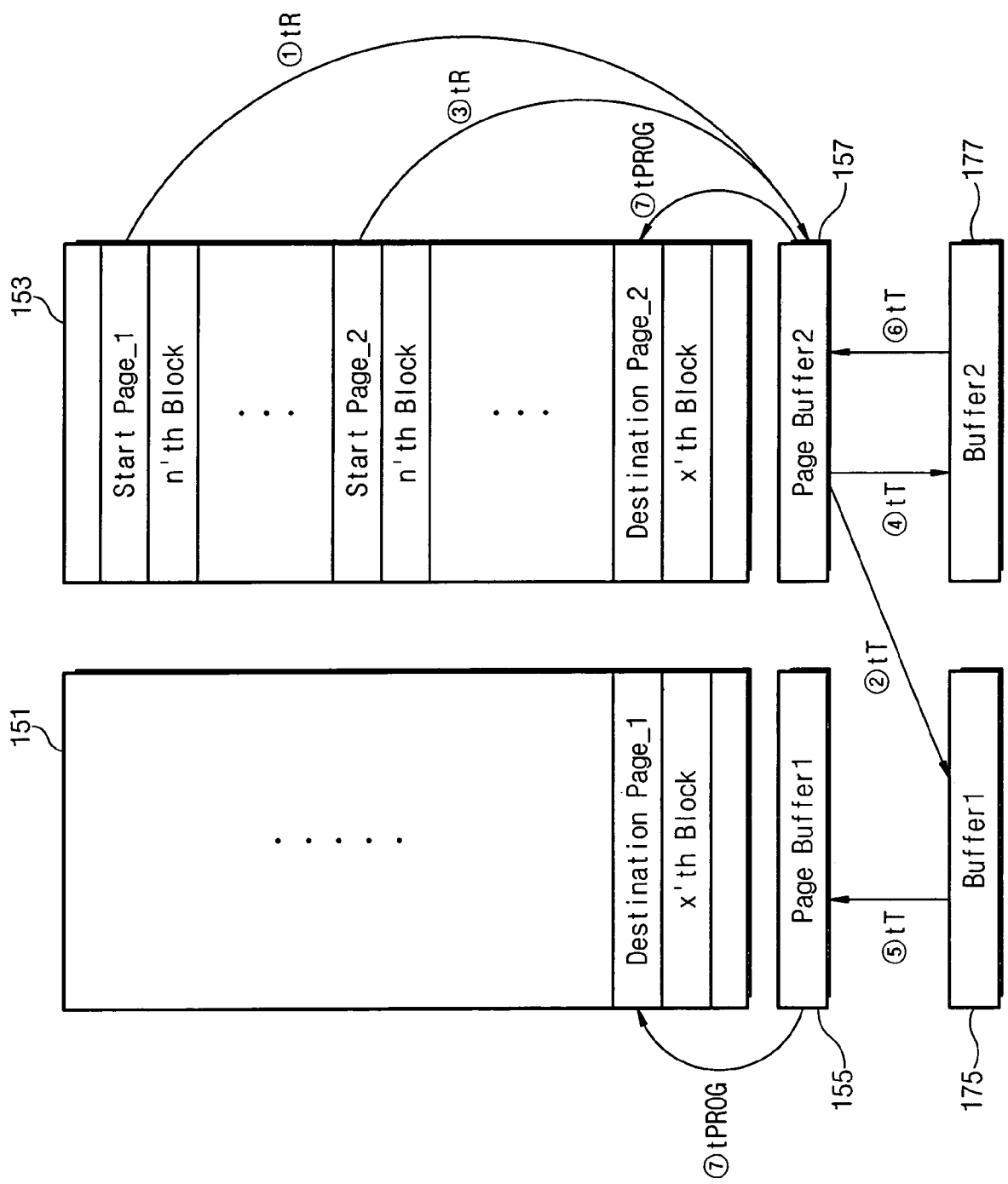
FIGS. 2 and 3 illustrate a multi-page copyback method embodiment.
Figure 3:
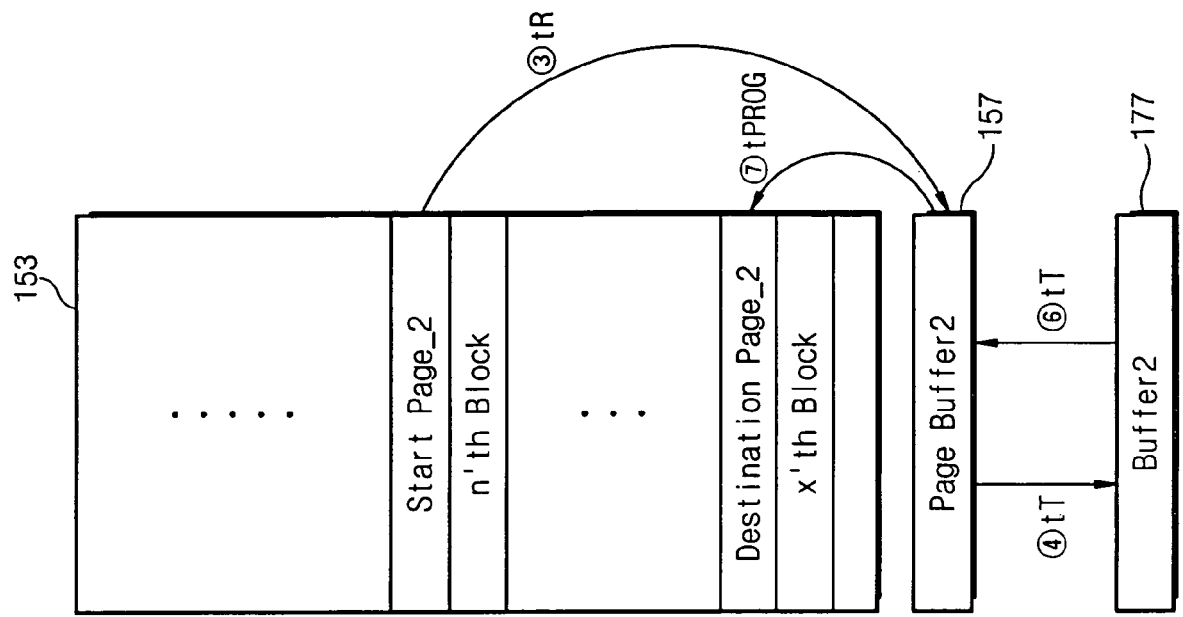
Figure 3:
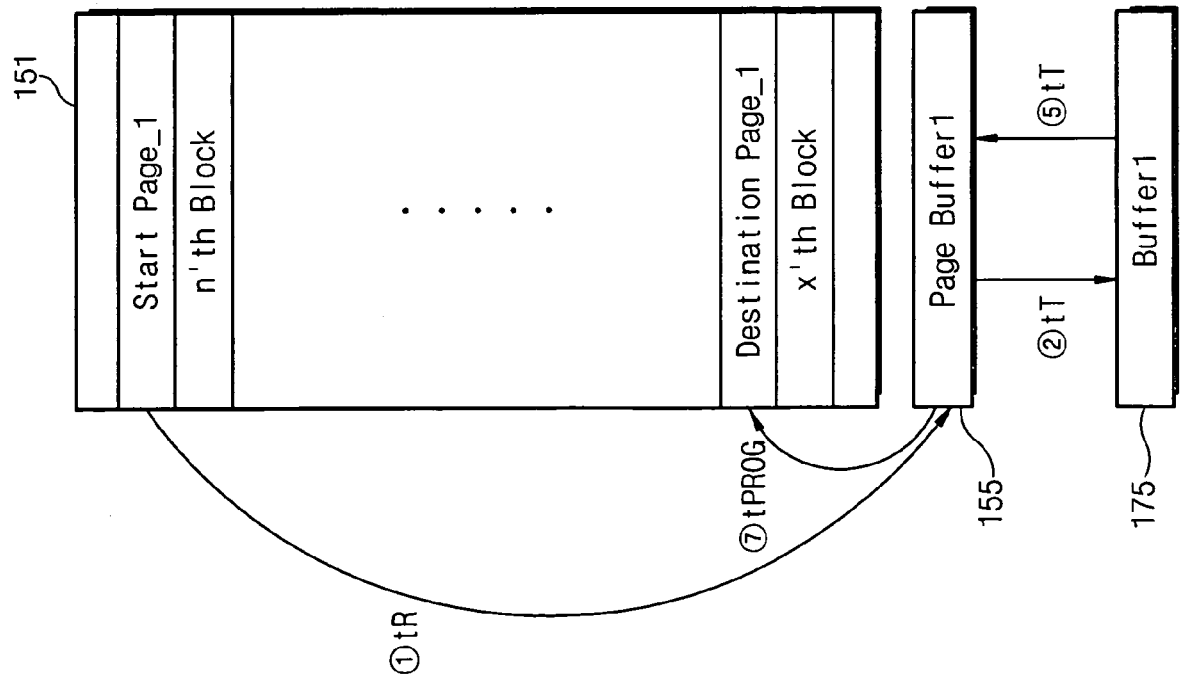

FIGS. 2 and 3 illustrate a multi-page copyback method embodiment. FIG. 2 shows a copyback performed by reading a plurality of copyback data from a mat. FIG. 3 shows a copyback performed by reading copyback data from respective mats.

Referring to FIG. 2, if a plurality of errors arise at one mat 153 among a plurality of mats 151 and 153 included in a flash memory 150, first copyback data is read out from an error-stricken page through a page buffer 157 (arrow 1, time tR). The read-out copyback data has a data size of one page (e.g., 2Kbytes). The first copyback data read out from the page buffer 157 is stored in the first buffer 175 (arrow 2, time tT). Afterwards, second copyback data is read out from an error-stricken page through the page buffer 157 (arrow 3, time tR). The second copyback data read out from the page buffer 157 is sequentially stored in the second buffer 177 (arrow 4, time tT). After all copyback data are stored in the first and second buffers 175 and 177, the first copyback data stored in the first buffer 175 is loaded on the first buffer 155 (arrow 5, time tT) and the second copyback data stored in the second buffer 177 are loaded on the second buffer 157 (arrow 6, time tT). These copyback data are simultaneously programmed to new target pages of the first and second mats 151 and 153 through the first and second page buffers 155 and 157, respectively (arrow 7, time tPROG irrespective of the number of pages). Copyback data read and write operations internally performed between the flash memory 150 and the buffer memory 170 are performed under the control of the control unit 110. A flash translation layer (FTL) manages error-stricken pages of the flash memory 150 and an address of a target page to which copyback data is transferred.

Referring to FIG. 3, if errors arise at respective mats 151 and 153 included in a flash memory 150, first copyback data is read out from the first mat 151 through a first page buffer 155 (arrow 1, time tR). The first copyback data read out from a first mat 151 is stored in a first buffer 175 (arrow 2, time tT). Second copyback data is read out from a second mat 153 through a second page buffer 157 (arrow 3, time tR). The second copyback data read out from the second mat 153 is stored in a second buffer 177 (arrow 4, time tT). After the copyback data are all stored in the first and second buffers 175 and 177, the first copyback data stored in the first buffer 175 is loaded on the first page buffer 155 (arrow 5, time tT) and the second copyback data stored in the second buffer 177 is loaded on the second page buffer 157 (arrow 6, time tT). If the copyback data is loaded on the first and second page buffers 155 and 157 respectively, the first and second page buffers 155 and 157 simultaneously program the loaded copyback data to the first and second mats 151 and 153 (arrow 7, time tPROG). Data read and write operations performed between the flash memory 150 and the buffer memory 170 are controlled by the control unit 110. An error arising at a mat is detected by an error correcting circuit (ECC) (not shown) included in the control unit 110 or a verify circuit (not shown) included in the flash memory 150.

Figure 4:
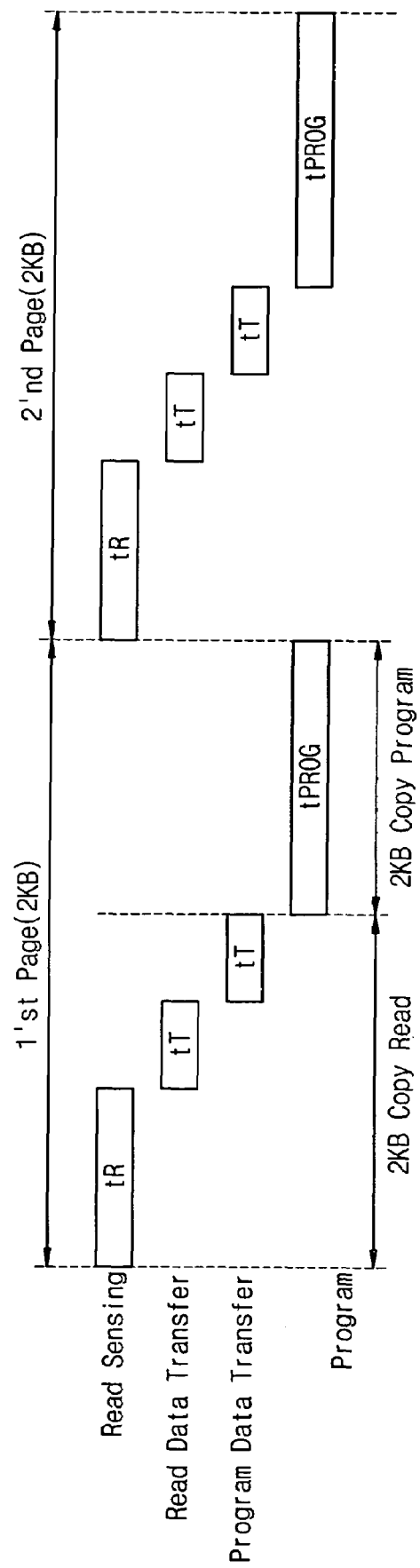
FIG. 4 illustrates a copyback time for a plurality of pages, in a copyback method embodiment.
Figure 5:
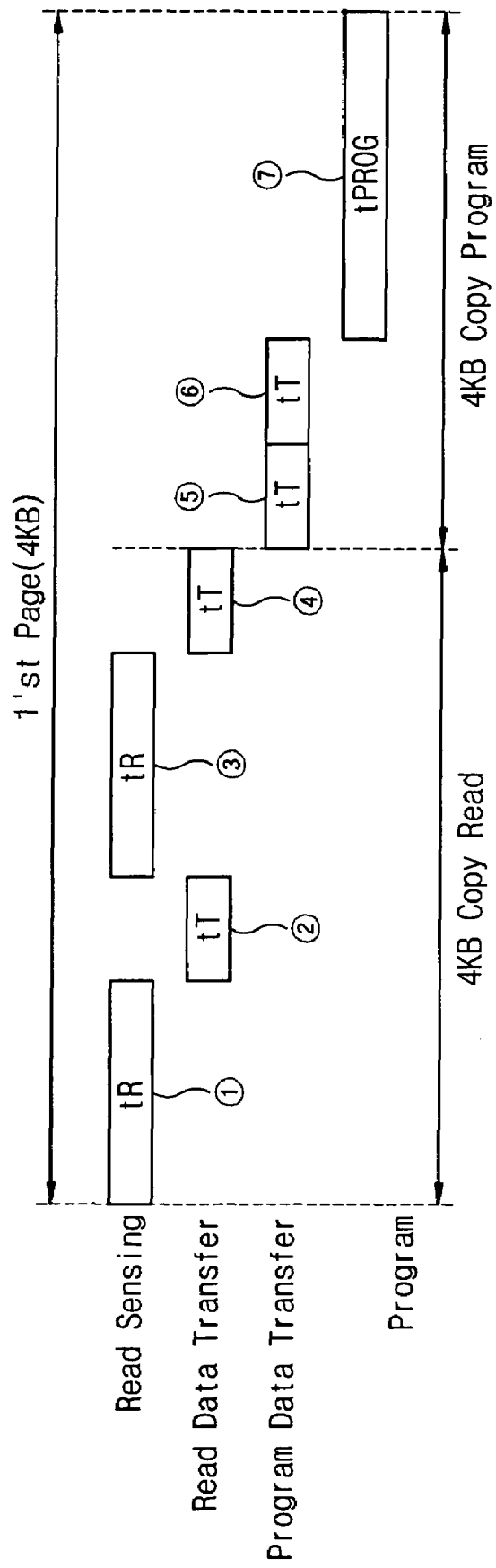
FIG. 5 illustrates a copyback time for a plurality of pages, which is required in a copyback method embodiment.

FIGS. 4 and 5 compare the copyback times of the inventive multi-page copyback method and a conventional copyback method.

FIG. 4 illustrates a copyback time for a plurality of pages, which is required in a conventional copyback method. FIG. 5 illustrates a copyback time for a plurality of pages, which is required in a copyback method according to the present invention.

Referring to FIG. 4, in a case where a copyback for a plurality of pages is performed in a conventional non-volatile memory device, a copyback operation for one page is completed and then a copyback operation for the next page is performed. For example, after copyback data corresponding to one page is read out (time tR) to be stored in a buffer (time tT), the stored copyback data is loaded on a page buffer (time tT). The loaded copyback data is then stored in a corresponding mat (or memory cell array) (time tPROG for each page). In this case, total time required for copyback of one page is tR+2tT+tPROG and total time required for copyback of N pages is N*(tR+2tT+tPROG). That is, in a conventional copyback method, the time required increases in direct proportion to the number of pages being copied back.

In an embodiment of the multi-page copyback method of the flash memory device 100, copyback operations for a plurality of pages are simultaneously performed. That is, the copyback operation for a next page does not need to wait for the completion of copyback operation of a previous page.

For example, in the multi-page copyback method according to the invention, a plurality of data read out from one or more mats are sequentially stored in a plurality of buffers. The stored data is simultaneously programmed to different mats. These data may be read out without limitation of locations of mats and the number of copyback data to be read out from the respective mats. The read-out data is simultaneously programmed to the mats to substantially reduce the program time tPROG. The program time tPROG is the largest component of the total time required for a copyback operation. It reduction substantially reduces the total time required for the copyback operation. The time required for a multi-page copyback according to the invention is N*(tR+2tT)+tPROG for N pages. The time a reduction of the inventive copyback method is enhanced with increasing number of pages.

The exemplary embodiment of the present invention can be realized as computer-readable code written on a computer-readable recording medium. The computer-readable recording medium includes all types of recording devices on which data can be recorded in a computer-readable manner. For example, the computer-readable recording medium includes a ROM, a RAM, a CD-ROM, a magnetic tape, a floppy disk, an optical data storage device, and a carrier wave, such as data transmission through the Internet. The computer-readable recording medium can be distributed over a plurality of computer systems that are connected to one another by a network, such that data can be stored in the computer-readable recording medium in a decentralized manner. In addition, functional programs, codes, and code segments that realize the present invention can be easily inferred by those skilled in the art.

According to the present invention, a non-volatile memory can simultaneously perform copyback operations for a plurality of pages even with a simple circuit configuration. A multi-page copyback method is not limited to locations and the number of copyback data, and a plurality of the copyback data may be simultaneously programmed. The total time required for copyback is, therefore, dramatically reduced with an increase in the number of copyback pages.

While the present invention has been particularly shown and described with reference to exemplary embodiments thereof, it will be understood by those of ordinary skill in the art that various changes in form and details can be made therein without departing from the spirit and scope of the present invention as defined by the following claims.

We claim:

1. A non-volatile memory device comprising:
   a plurality of mats to store data;
   a plurality of page buffers, each page buffer corresponding to a mat and configured to read and write data from the corresponding mat;
   a plurality of buffers, each buffer corresponding to a page buffer and a mat, where each buffer is configured to store copyback data read out from at least one of the plurality of page buffers; and
   a control unit to control the plurality of page buffers such that each page buffer substantially simultaneously programs the copyback data from the plurality of buffers to the plurality of mats, each buffer configured to program the copyback data to a corresponding mat.

2. The non-volatile memory device of claim 1 where the plurality of page buffers is adapted to randomly read the copyback data from the plurality of mats.

3. The non-volatile memory device of claim 1 where the plurality of page buffers is adapted to read copyback data from different pages of a same mat.

4. The non-volatile memory device of claim 1 where the plurality of page buffers is adapted to read copyback data from at least two different mats.

5. The non-volatile memory device of claim 1 where the device includes as many page buffers as mats.

6. The non-volatile memory device of claim 1 where each of the page buffers has a data storage space of at least one page.

7. The non-volatile memory device of claim 1 where the copyback data has a data size of one page.

8. A method for multi-page copyback, comprising:
   reading copyback data from at least one mat of a plurality of mats corresponding to a plurality of page buffers;
   storing the read copyback data from at least one of the plurality of page buffers into a plurality of buffers, each buffer corresponding to a page buffer and a mat;
   sequentially transferring the stored copyback data from the plurality of buffers to the plurality of page buffers; and substantially simultaneously programming the transferred copyback data from the plurality of page buffers to the plurality of mats.

9. The multi-page copyback method of claim 8 where reading includes randomly reading out the copyback data from the at least one mat.

10. The multi-page copyback method of claim 8 where reading includes reading the copyback data from different pages of the least one mat.

11. The multi-page copyback method of claim 8 where reading includes reading the copyback data from at least two different mats.

12. The multi-page copyback method of claim 8 including making equal the plurality of page buffers to the plurality of mats.

13. The multi-page copyback method of claim 8 including making a data storage space of each of the buffers to at least one page.

14. The multi-page copyback method of claim 8 where reading includes reading one page of the copyback data.

* * * * *